United States Patent [19]

Townsend

[11] 4,127,096
[45] Nov. 28, 1978

[54] INTERNAL COMBUSTION ENGINE

[75] Inventor: Ray T. Townsend, Des Moines, Iowa

[73] Assignee: Townsend Engineering Company, Des Moines, Iowa

[21] Appl. No.: 678,389

[22] Filed: Apr. 19, 1976

Related U.S. Application Data

[63] Continuation-in-part of Ser. No. 488,781, Jul. 15, 1974, Pat. No. 3,967,599, and Ser. No. 576,198, May 9, 1975, abandoned, which is a continuation-in-part of Ser. No. 488,782, Jul. 15, 1974, abandoned, said Ser. No. 488,781, is a continuation-in-part of Ser. No. 351,606, Apr. 16, 1973, Pat. No. 3,828,740, which is a continuation-in-part of Ser. No. 286,189, Sep. 5, 1972, abandoned.

[51] Int. Cl.$^2$ .............................................. F01P 1/04
[52] U.S. Cl. .............................. 123/41.56; 123/41.71; 123/58 AA; 123/58 AM; 123/193 CH; 123/193 CP; 123/193 P
[58] Field of Search ......... 123/58 R, 58 AA, 58 AM, 123/41.71, 193 R, 193 C, 193 CP, 193 CH, 193 P, 193 H, 41.56

[56] References Cited

U.S. PATENT DOCUMENTS

| | | | |
|---|---|---|---|
| 1,410,776 | 3/1922 | Thomas | 123/193 CP |
| 1,770,237 | 7/1930 | Kondo | 123/41.71 |
| 1,824,528 | 9/1931 | Bailey | 123/41.71 X |
| 2,026,848 | 1/1936 | Ruber | 123/41.71 UX |
| 2,194,097 | 3/1940 | Reggio | 123/193 P |
| 2,399,743 | 5/1946 | Kahl | 123/58 UX |
| 2,512,739 | 6/1950 | Duncan | 123/193 C |
| 3,494,335 | 2/1970 | Meier | 123/193 CP |
| 3,892,209 | 7/1975 | Amiot | 123/41.71 X |
| 3,968,776 | 7/1976 | Rund | 123/43 A |

FOREIGN PATENT DOCUMENTS 1,188,915   3/1959   France ................................. 123/58 R Primary Examiner—Clarence R. Gordon
Attorney, Agent, or Firm—Zarley, McKee, Thomte, Voorhess & Sease

[57] ABSTRACT

An internal combustion engine comprising an engine frame having a drive shaft rotatably mounted therein and extending outwardly therefrom. A pair of cylinder sleeves are mounted on the engine frame and have their inner ends positioned within the interior of the frame and their outer ends positioned outwardly thereof. A cylinder head is secured to the outer end of each of the sleeves and is separated thereby by means of a heat insulative gasket. Each of the cylinder heads has a dome-shaped chamber formed therein which is in communication with a source of combustible fuel. An air inlet conduit is mounted on one end of the engine frame and is in communication with a source of air under pressure such as a blower, supercharger or the like. The air inlet conduit is in communication with an air passageway formed in the engine frame which is in communication with air inlet openings formed in the cylinder sleeves. The cylinder sleeves are provided with exhaust openings formed therein which communicate with an air exhaust passageway formed in the engine frame. The exhaust passageway is connected to exhaust conduit or pipe extending from the engine frame. A piston is slidably mounted in each of the sleeves and has a dome-shaped head portion which is adapted to be received by the dome-shaped chamber in the cylinder head when the piston is in its top position. In the top position, a small "air space" is present between the walls or sides of the piston head and the walls or sides of the sleeves. The "air space" serves as a means for retarding the absorption of heat into the sides of the piston head and the sides of the cylinder sleeve. In the down position, the "air space" also serves to spread the cooling air into a thin, wide sheet for more efficient cooling of the cylinder head and sleeves. Optional air deflecting fins may be employed on the piston head. The rings of the piston are conventionally lubricated and slide upon the interior wall of the cylinder sleeve. Each of the pistons has a roller mounted on the skirt portion thereof which rolls upon a cam mounted on a rotor plate which is secured to the drive shaft for rotation therewith. A return roller is also operatively mounted on the skirt portion of the piston for engagement with a return cam which is mounted on the drive shaft for rotation therewith.

20 Claims, 19 Drawing Figures

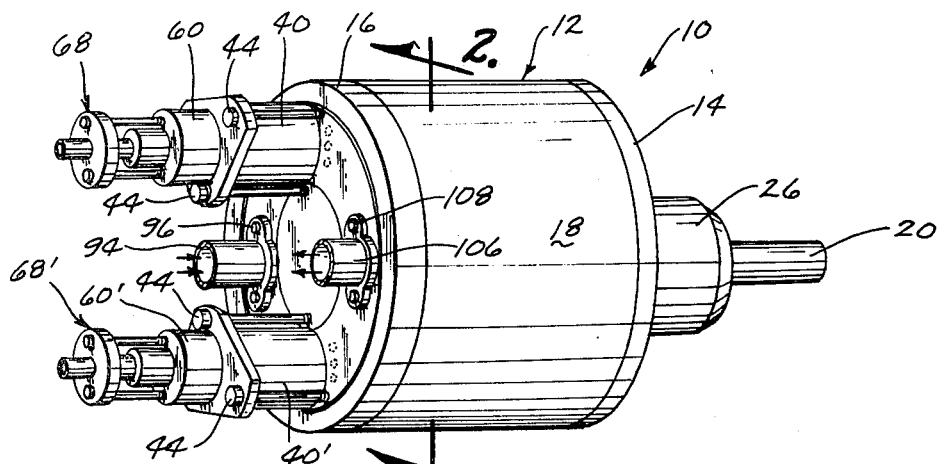
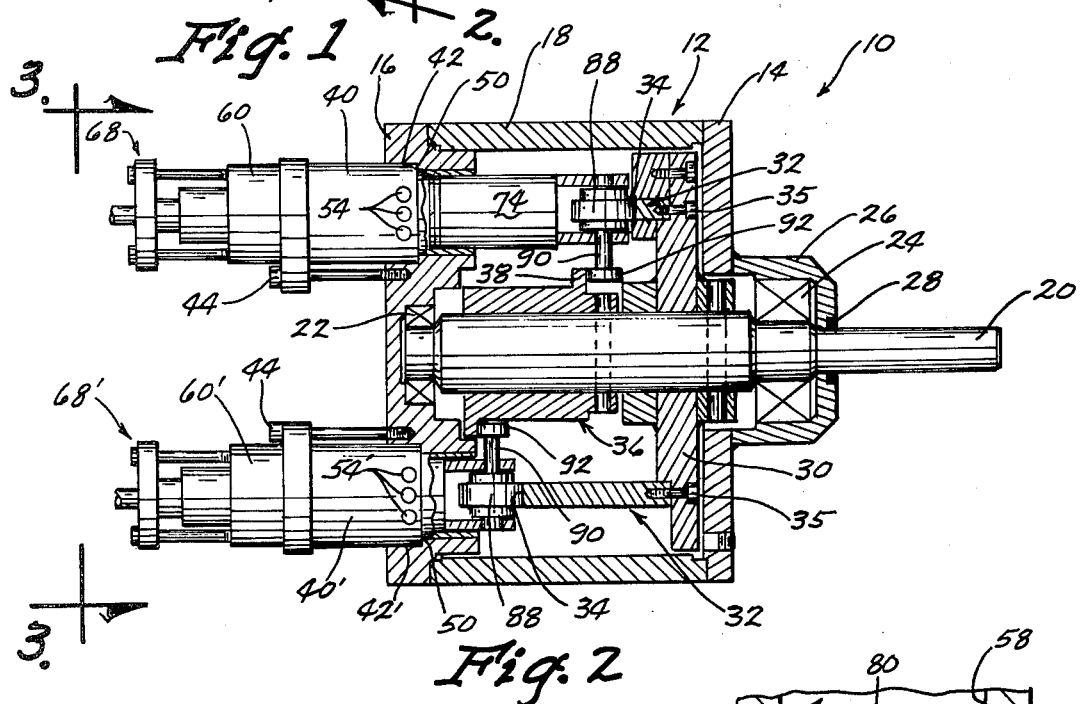
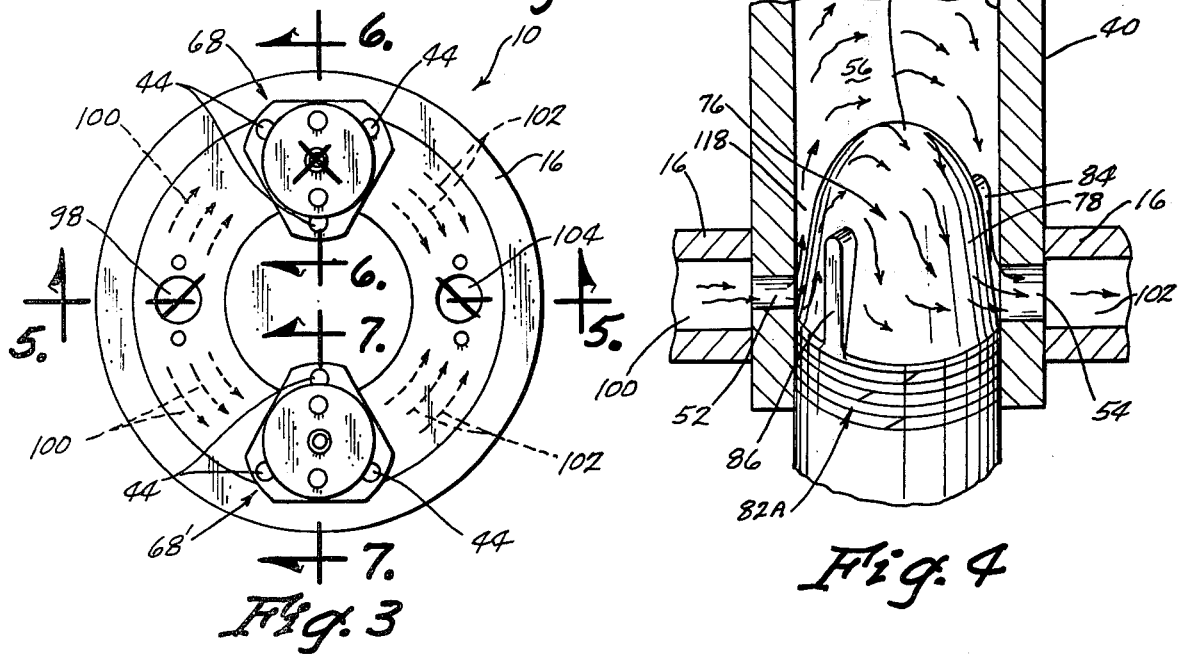
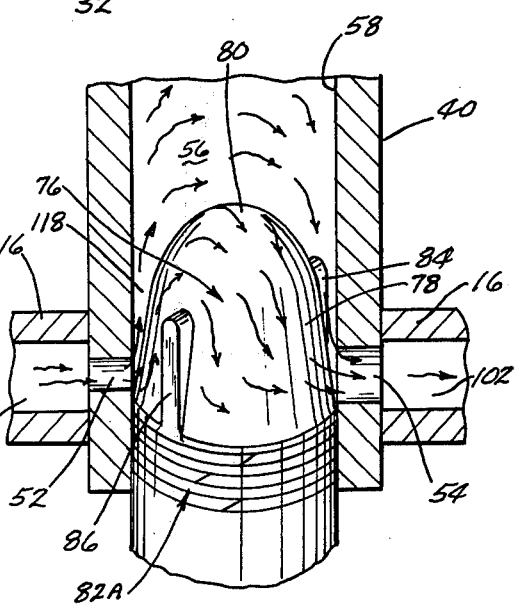

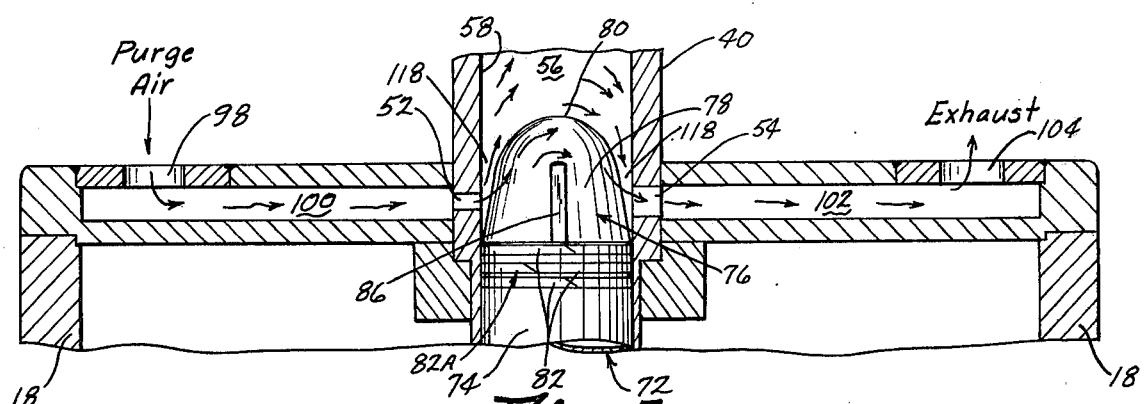
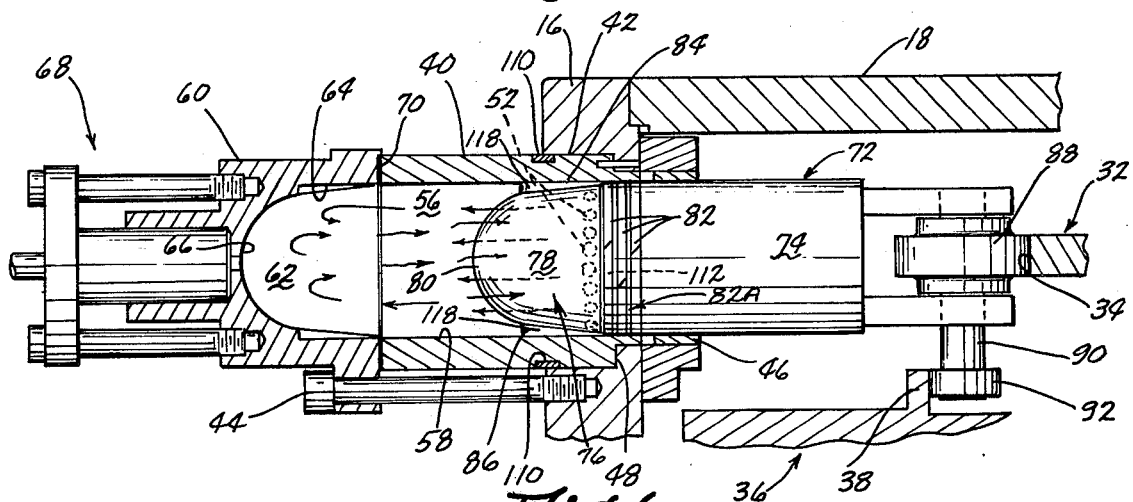
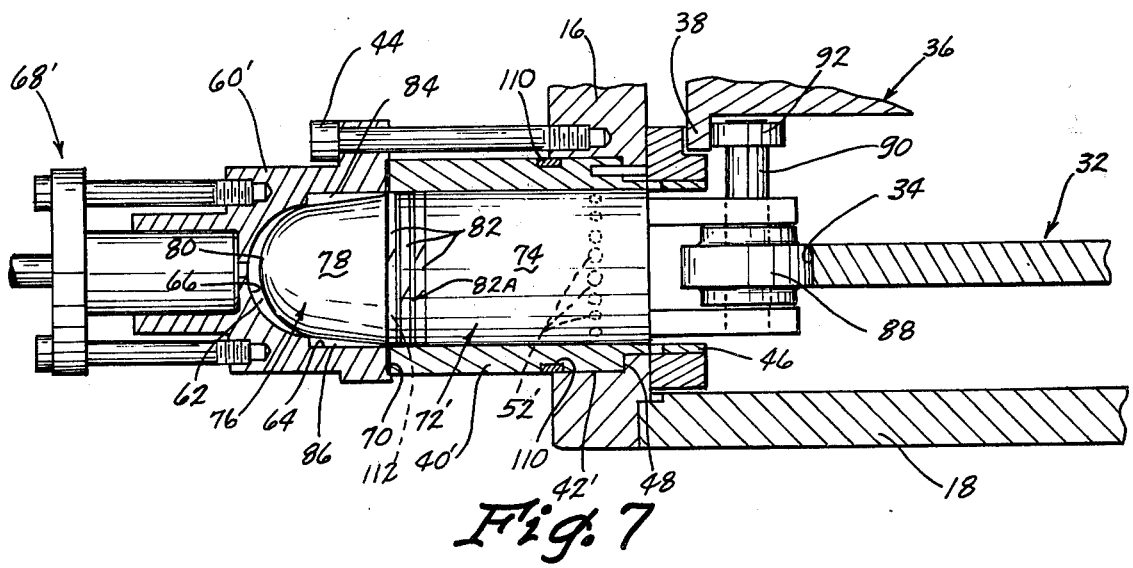

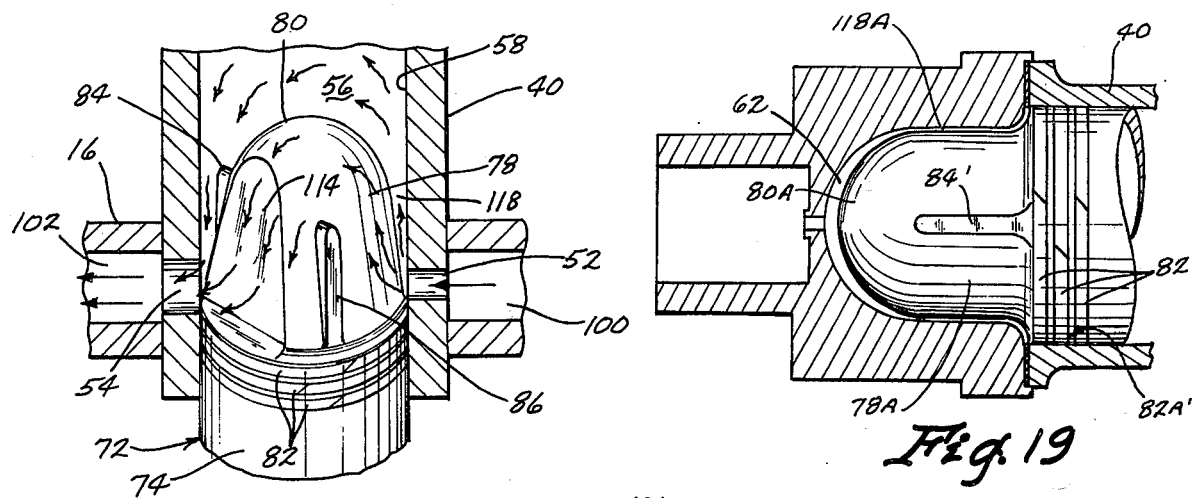
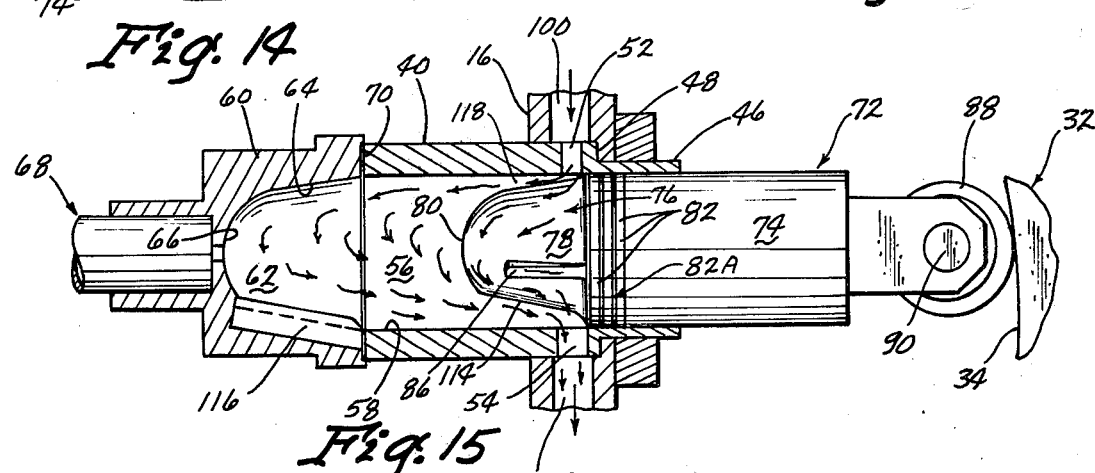
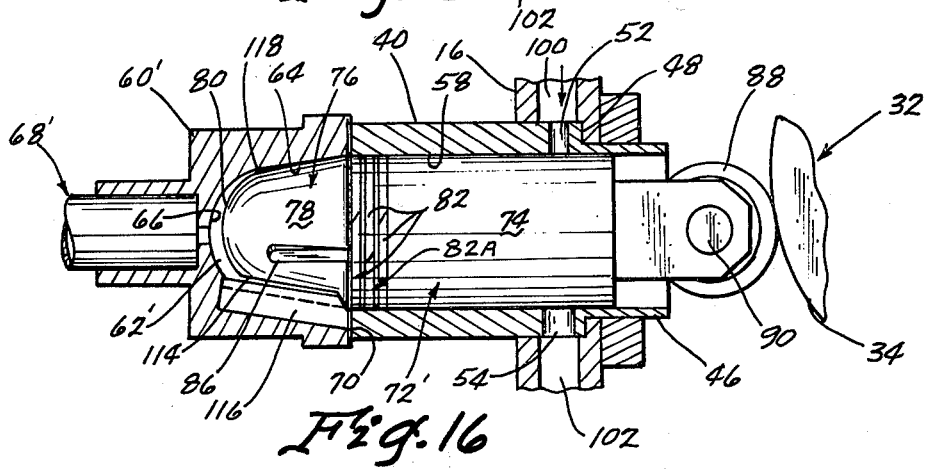

INTERNAL COMBUSTION ENGINE

This application is a continuation-in-part of co-pending U.S. application Ser. No. 488,781, filed July 15, 1974, now U.S. Pat. No. 3,967,599, which was a continuation of application Ser. No. 351,606, filed Apr. 16, 1973, now U.S. Pat. No. 3,828,740 issued Aug. 13, 1974, said application being a continuation-in-part of application Ser. No. 286,189 filed Sept. 5, 1972 (now abandoned); and co-pending U.S. application Ser. No. 576,198 filed May 9, 1975 (now abandoned), which was a continuation-in-part of application Ser. No. 488,782 filed July 15, 1974 (now abandoned).

BACKGROUND OF THE INVENTION

This invention relates to an internal combustion engine and more particularly to an internal combustion engine having improved means associated therewith for preventing the transfer of heat to the cylinder sleeve and piston, whereby the sealing rings and lubricating oil are kept at a relatively low temperature while the combustion chamber and the top of the piston are relatively hot.

Cooling problems are experienced in internal combustion engines and are especially present in internal combustion engines of the rotary type. In diesel engines, for example, it is especially desirable to maintain the combustion chamber at extremely high temperatures so that improved ignition and power characteristics are achieved. If the combustion chamber is maintained at sufficiently high temperatures so as to achieve the desired ignition, heat is transferred to the cylinders and pistons such that it is extremely difficult to lubricate the piston rings and bearing surfaces since the lubricating quality of the oil tends to break down under such extreme high temperatures.

Therefore, it is a principal object of the invention to provide an internal combustion engine which can be operated with hotter temperatures in the combustion chamber while at the same time permitting the surfaces upon which the rings create sealing engagement to be at a substantially cooler temperature.

A still further object of the invention is to provide an internal combustion engine having the cylinder heads and cylinder sleeves separated by heat insulative gaskets.

A still further object of the invention is to provide an internal combustion engine having means for retarding the absorption of heat into the cylinder heads, sleeves and pistons.

A still further object of the invention is to provide an internal combustion engine which utilizes a small "air space" between a piston head and combustion chamber for retarding the absorption of heat into a large portion of the piston head and the walls of the combustion chamber.

A still further object of the invention is to provide an internal combustion engine employing a small "air space" between a dome-shaped piston head and the interior wall of the cylinder sleeve so that the cooling air will be spread out into a thin, wide sheet of air for more efficient cooling.

A still further object of the invention is to provide an internal combustion engine wherein the piston rings are substantially separated from the combustion chamber.

A still further object of the invention is to provide an internal combustion engine wherein the combustion chamber and ring sealing surfaces are separated.

A still further object of the invention is to provide an internal combustion engine which is economical to manufacture, durable in use and refined in appearance.

SUMMARY OF THE INVENTION

In the instant invention, a drive shaft is rotatably mounted in an engine frame and extends outwardly therefrom. A rotor plate is mounted on the drive shaft in the engine frame for rotation therewith and has a cam mounted thereon. A return cam is also mounted on the drive shaft for rotation therewith. Cylinder sleeves are mounted in the engine frame and extend outwardly therefrom and have pistons slidably mounted thereon. Each of the pistons has a pair of rollers mounted thereon which engage the cam and return cam respectively so that the piston is moved between its top and bottom positions. A cylinder head is mounted on each of the cylinder sleeves and has a dome-shaped combustion chamber formed therein adapted to receive the dome-shaped piston head when the piston is in its top position. Means is provided for introducing combustible fuel to the interior of the combustion chamber. The cylinder sleeves and heads are separated by a heat insulative gasket so that the heat of combustion is not readily transferred from the cylinder head to the cylinder sleeves. The design of the chamber and the piston head is such that a small "air space" is provided therebetween which retards the absorption of heat into the piston head and the cylinder head wall. Cooling air is supplied to the cylinder sleeve and is directed around the dome-shaped piston head to cool the same. The piston rings of the piston slide upon sealing surfaces which are separated from the cylinder head.

A modified form of the piston head employs a pair of oppositely disposed air deflecting fins which cause the cooling air to pass over the top portion of the piston rather than around the piston head. A still further modified form of the piston head employs a milled surface at the exhaust side thereof for aiding in the discharge of cooling and exhaust gases from the interior of the cylinders. A still further modified piston head has its central side portions in the shape of a cylinder.

BRIEF DESCRIPTION OF THE DRAWINGS

FIG. 1 is a partial perspective view of the engine of this invention;

FIG. 2 is a partial sectional view seen on lines 2—2 of FIG. 1;

FIG. 3 is an end view seen on lines 3—3 of FIG. 2;

FIG. 4 is a partial perspective view illustrating a piston in its bottom position;

FIG. 5 is an enlarged sectional view seen on lines 5—5 of FIG. 3;

FIG. 6 is an enlarged sectional view seen on lines 6—6 of FIG. 3;

FIG. 7 is an enlarged sectional view seen on lines 7—7 of FIG. 3;

FIG. 14 is a partial perspective view of a modified form of the piston head;

FIG. 15 is a view similar to FIG. 6 except that the piston of FIG. 14 is employed;

FIG. 16 is a view similar to FIG. 7 except that the modified piston of FIG. 14 is employed;

FIG. 19 is a sectional view similar to that of FIG. 17 but showing the modified piston of FIG. 18 in its compression position.

DESCRIPTION OF THE PREFERRED EMBODIMENT

Figure 8:
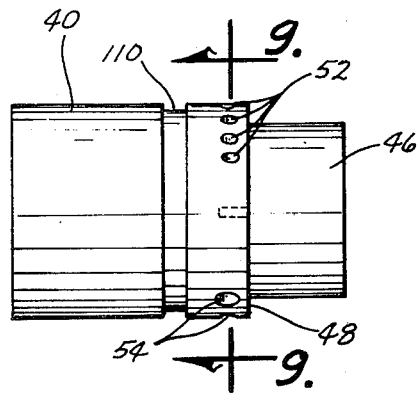
FIG. 8 is an elevational view of the cylinder sleeve of the invention.
Figure 9:
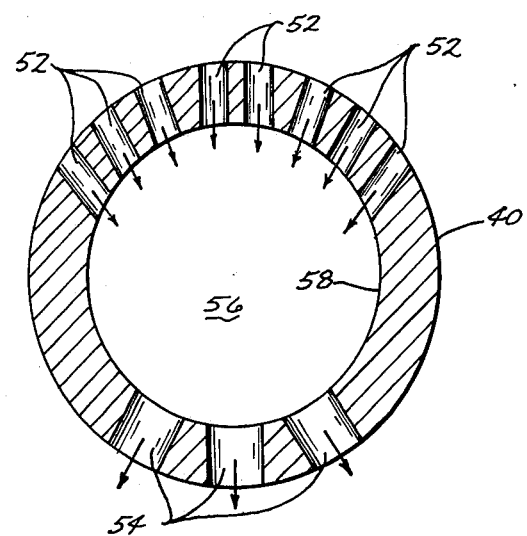
FIG. 9 is an enlarged sectional view seen on lines 9—9 of FIG. 8.

The engine of this invention is referred to generally by the reference numeral 10 and generally comprises an engine frame or block 12 including end frames 14 and 16 having cylindrical frame 18 secured thereto and extending therebetween. The numeral 20 refers to a drive shaft which is rotatably mounted in the engine as best seen in FIG. 2. One end of shaft 20 is mounted in a bearing 22 which is mounted in end frame 16. Shaft 20 is also rotatably mounted in bearing 24 which is mounted in hub or extension 26 welded to the outer surface of end frame 14. A suitable seal 28 sealably embraces shaft 20 as seen in FIG. 2.

Figure 10:
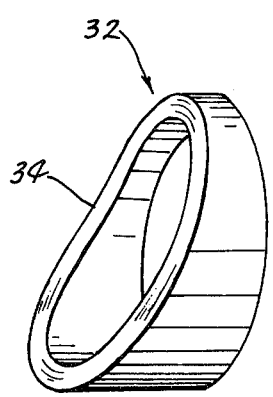
FIG. 10 is a perspective view of the cam of the engine.
Figure 11:
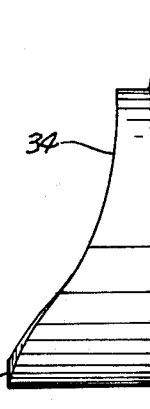
FIG. 11 is a side view of the cam of FIG. 10.
Figure 12:
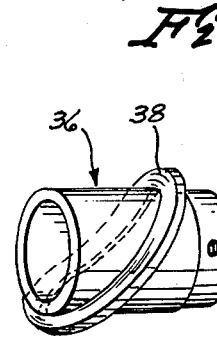
FIG. 12 is a perspective view of the return cam of the engine.
Figure 13:
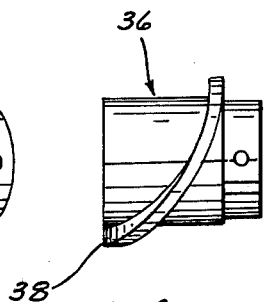
FIG. 13 is a side view of the cam of FIG. 12.
Figure 17:
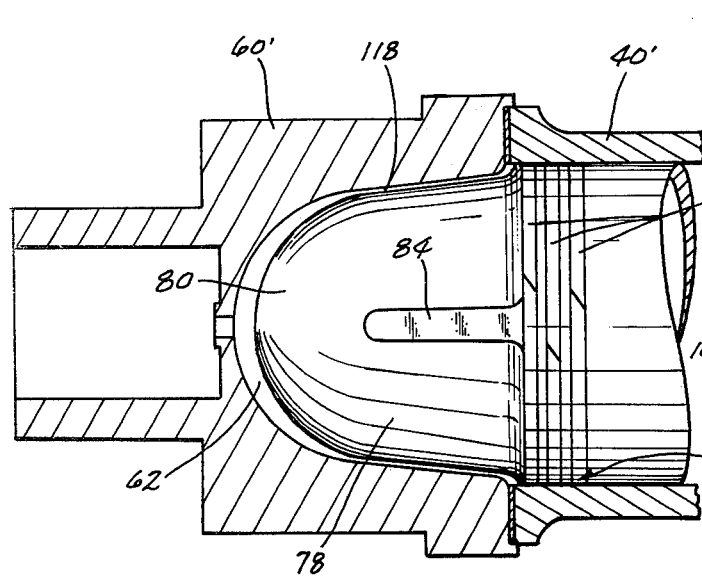
FIG. 17 is an enlarged scale sectional view taken on a plane perpendicular to that of FIG. 7.

Rotor 30 is secured to shaft 20 by any convenient means for rotation therewith. Cam 32 is secured to rotor 30 by means of cap screws 35. As seen in FIGS. 10 and 11, cam 32 is annular in shape and is provided with a cam surface 34 provided thereon. A return cam 36 is mounted on shaft 20 and secured thereto by any convenient means for rotation therewith and includes a cam surface 38 provided thereon.

A pair of cylinder sleeves 40 and 40' are mounted in openings 42 and 42' formed in end frame 16 and are maintained therein by means of bolts 44 as will be described hereinafter. Inasmuch as each of the cylinder sleeves are identical, only cylinder sleeve 40 and related structure will be described in detail with "'" indicating identical structure on cylinder sleeve 40' and related structure. As seen in FIG. 8, sleeve 40 is provided with a reduced diameter portion 46 defining a shoulder 48 which is received against shoulder 50 in end frame 16. Sleeve 40 is provided with a plurality of spaced apart intake openings 52 formed at one side thereof and larger exhaust openings 54 provided at the other side thereof. Sleeve 40 is provided with a cylindrical chamber 56 formed therein defined by wall surface 58. Cylinder head 60 is secured to the outer end of cylinder sleeve 40 and to end frame 16 by means of the bolts 44 (FIG. 6) and is provided with a dome-shaped combustion chamber 62 formed therein. For purposes of description, the combustion chamber 62 will be described as being defined by a side wall portion 64 and a top wall portion 66. The numeral 68 refers generally to a fuel injection apparatus which is in communication with the combustion chamber 62 as seen in FIG. 15 so as to supply combustible fuel thereto at the proper time. A heat insulating gasket 70 is provided between cylinder head 60 and cylinder sleeve 40 to retard the transfer of heat from the extremely hot cylinder head 60 to the cylinder sleeve 40.

Pistons 72 and 72' are slidably mounted in sleeves 40 and 40'. Piston 72 comprises a skirt portion 74 and a dome-like piston head 76. For purposes of description, piston head 76 will be described as comprising a tapered wall surface 78 and a top portion 80. For purposes of description hereafter, reference will be made to the following portions of piston head 76: The top portion 80; the central side portion 78; and the bottom portion 82A. The preferred configuration of wall surface 78 is the tapered dome as seen in the drawings. However, a cylindrical wall surface may be employed. A plurality of sealing rings or piston rings 82 are mounted in suitable grooves formed in piston 72 between the head 76 and skirt 74 and are adapted to sealably engage the wall surface 58 of sleeve 40. Piston head 76 is complementary in shape to the combustion chamber 62, although slightly smaller, as best seen in FIG. 7. FIGS. 5, 6 and 7 illustrate a pair of oppositely disposed air deflecting fins 84 and 86 extending from the opposite sides of piston head 76 for a purpose to be described in greater detail hereinafter. A roller 88 is suitably rotatably mounted on the piston 72 and is adapted to roll upon the cam surface 34 of cam 32. Roller 88 includes a shaft portion 90 extending therefrom which has a roller 92 rotatably mounted on the outer end thereof. Roller 92 is adapted to roll upon the cam surface 38 of return cam 36. Thus, cam 32 urges the piston 72 to its "top" position while the return cam 36 urges the piston 72 to its "bottom" position.

The numeral 94 refers to an air inlet conduit which is secured to end frame 16 by bolts 96 and which is in communication with air inlet opening 98. Air inlet opening 98 is in communication with a transversely extending air passageway 100 formed in end frame 16 and which communicates with the air inlet openings 52 and 52' of the sleeves 40 and 40' respectively. End frame 16 is also provided with a transversely extending air passageway 102 which communicates with the openings 54 and 54' in sleeves 40 and 40' respectively. Exhaust opening 104 is in communication with air passageway 102. The numeral 106 refers to an exhaust conduit secured to end frame 16 by bolts 108. Air is forced into openings 94 and air passageway 100 by suitable blower or supercharger means (not shown). The exhaust openings 54 are preferably slightly offset with respect to the air intake openings 52 so that the exhaust openings will close earlier than the intake openings so that the supercharged pressure within the sleeves can be maintained. This could be achieved by lowering the exhaust opening 54 with respect to the intake opening 52 as shown in FIG. 4.

The numeral 110 refers to a copper band which extends around each of the cylinder sleeves to aid in uniformly distributing the temperature around the cylinder sleeve. In other words, the cylinder sleeve is the hottest adjacent the exhaust openings 54. The copper band 110 conducts the heat around the sleeve to achieve a more nearly uniform temperature around the sleeve.

If desired, a copper plate 112 (not shown) may be provided in the piston head 76 to likewise achieve a more uniform temperature between the exhaust and intake sides thereof. (See FIGS. 6 and 7). Preferably, the cylinder heads, cylinder sleeves and pistons are comprised of a low heat conductance material such as stainless steel or the like. Stainless steels are iron-base alloys containing nickel and chromium, with more chromium than 12% to produce passivity but less than 30%. Stainless steel is desirable because it has a much lower thermal conductivity than does cast iron. For example, at room temperature, cast iron typically has a thermal conductivity value of 0.112 as contrasted to stainless steel (AISI type 304) which has a value of 0.036. Type 304 is preferred and includes 18 1 to 20% of chromium and 8 to 12 parts of nickel. The 300 series (AISI types) of stainless steel are preferred over other series. Reference is made to *Metals Handbook*, Volume 1, pp. 408, 409, 422, and 423, et seq. which is published by the American Society of Metals.

FIGS. 14–16 illustrate a modified form of the piston head. The piston head 78 is provided with a cut-out or milled area 114 formed at one side thereof for facilitating the passage of exhaust gases and cooling air thereby to the exhaust openings 54. The cylinder head 60 is provided with an insert 116 in chamber 62 to compensate for the milled area 114 of piston head 78 when the piston is in its top position as illustrated in FIG. 16.

In operation, combustible fuel is supplied to the combustion chambers 62 and 62' through the fuel injection apparatuses 68 and 68' respectively. Air under pressure is supplied to opening 98 so that air will be supplied to the interiors of the cylinder sleeves 40 and 40' when the pistons are in their bottom positions such as illustrated in FIG. 5. When the pistons are in their top position, the sealing rings 82 are positioned above the openings 52 and 54 to prevent the flow of air into the interior of the cylinders and to prevent the discharge of air outwardly therefrom.

Assuming that the piston 72 is in the top position of FIG. 7 and that fuel has been supplied to the combustion chamber and has been compressed, ignition of the combustible fuel will be caused by the heat and pressure present in the combustion chamber. During combustion, the interior of the cylinder head and the piston head, which form most of the combustion chamber, are exposed to the very hot heat of combustion but the area between the tapered side walls of the piston and the tapered side walls 64 of the cylinder head 60 acts as a dead air space or air space where the gases are trapped and very little turbulence or scrubbing of the surface is possible. This air gap or air space is referred to generally by the reference numeral 118. Preferably, the space 118 is only a few thousandths of an inch wide when the piston is in the compressed position of FIG. 7. Space 118 preferably has a width in the order of one-sixteenth of an inch when the piston is in its expansion position shown in FIG. 6. While in the "upper" position of FIG. 7, the piston and the walls of the head 60 tend to pull heat out of the air and fuel in the space 118 which tends to prevent combustion in that space. Since the space is so confined, very little fuel is located therein. Since the space 118 is narrower than the piston is in its upper position, better compression is achieved within the combustion chamber. Further, the narrow configuration of the space 118 during compression reduces turbulence of the air therein which tends to insulate the piston and the combustion chamber walls from the heat of combustion. Combustion essentially does not take place in the space 118 when the piston is in its upper position. As a result, the side central portion 78 of piston 76 and the walls of the cylinder adjacent thereto tend to be shielded, insulated and protected from the high heat of combustion to which the top portion 80 of the piston is exposed. This is particularly true during the first 20 percent of the compression stroke. This tends to protect the lower portion 82A of the piston from this excessive heat.

When the piston is in its lower position as shown in FIG. 6, space 118 is appreciably wider and serves as a high velocity air space to receive the cooling air.

The net effect of the function of the space 118 as described above, in conjunction with the insulating gasket 70 and the low heat conducting material of the engine components serves to keep the lower portion 82A of the piston and the wall surface 58, which are engaged by piston rings 82, at a substantially lower temperature than the top portion 80 of the piston and the cylinder head 60. Thus, the temperature of the top portion 80 of the piston may be as high as 1,000° F. while the lower portion 82A of the piston and the cylinder walls against which the piston rings are imposed may be at a temperature of 250° to 300° F.

The force of combustion causes the pistons to move from the top position of FIG. 7 to the bottom position of FIG. 6 which causes cam 32, rotor plate 30 and drive shaft 20 to be rotated. When the piston is in the bottom position such as illustrated in FIG. 6, the intake openings and exhaust openings are exposed to permit purging, cooling and recharged air to be blown in through the intake openings 52 and up through the gap between the piston head and cylinder wall as illustrated in FIG. 5. The air blown into the intake openings purges the exhaust gas and furnishes additional cooling air down through the gap on the other side of the piston head and out the exhaust openings 54 surrounding that half of the cylinder. The dome-shaped piston head effectively spreads the cooling air out into a thin, wide sheet which is intimately exposed to, and scrubs, the same surfaces of the cylinder and piston that are retarded from heat absorption during combustion. The fins 84 and 86 are optional and are designed to cause the incoming air to pass over the upper portion of the piston head as illustrated by the arrows in FIG. 5. Without fins 84 and 86, some air would tend to pass around the piston head rather than over the top of the piston head.

It is also preferred that low heat conductance stainless steel be used for the cylinder head, cylinder sleeves and pistons so that the high temperatures of the piston head and cylinder head, which form the combustion chamber, will not be readily conducted to the surfaces which are to be cooled. In effect, a high temperature is maintained in the combustion area with a low temperature being maintained for the piston ring sealing surfaces and bearing surfaces of the cylinder. This is accomplished by creating the "dead air space" previously discussed while accelerating the heat loss through the cooling air by spreading the cooling air into a thin, wide sheet as also previously discussed.

It should be noted that the heat insulative gasket 70 serves to prevent the extremely high temperatures of the cylinder head from passing to the cylinder sleeve. It should also be noted that the sealing rings 82 do not slide upon the inner wall surface of the cylinder head but slide only on the inner wall surface of the cylinder sleeve which is maintained at a much cooler temperature than the cylinder head. Thus, since the sealing surfaces of the sealing rings are maintained at a much lower temperature than the cylinder head, the temprature of the same is well within the practical limits of lubrication. The construction of the engine also makes it possible to maintain the cylinder head at an extremely high temperature so that improved ignition and power characteristics are achieved. The copper band 110 is also optional and serves to uniformly spread the temperature around the exterior of the cylinder head as previously discussed. Likewise, the band 112 on the piston head is also optional and serves to more uniformly distribute the heat around the piston head.

As stated, FIGS. 14–16 illustrate a modified form of the piston head and combustion chamber. The piston head 78 is provided with the milled area 114 at the exhaust side thereof as illustrated in the drawings. The milled area is provided to permit a more rapid and efficient flow of air by the piston to the discharge openings 54. The filler or insert 116 is simply provided in the combustion chamber to make the interior of the combustion chamber complementary to the shape of the milled area 114.

Figure 18:
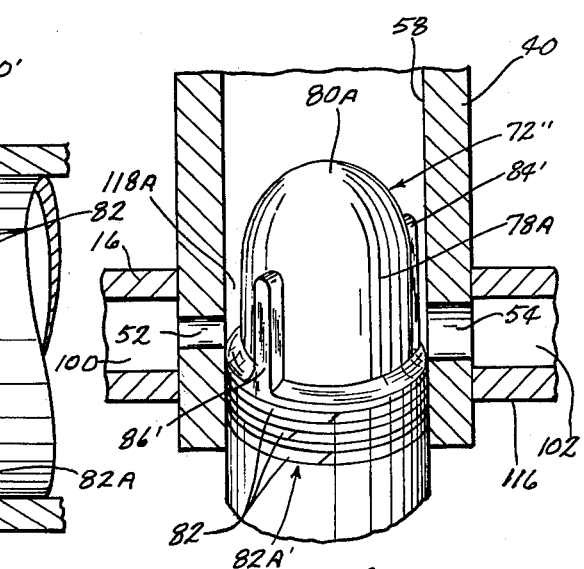
FIG. 18 is a partial perspective view of a modified form of the piston illustrating its expansion position.

The modified piston 72' of FIG. 18 has its central side portion 78A cylindrically shaped. A space 118A appears around the central side portion. This piston functions essentially the same as piston 72 insofar as its ability to keep the rings 82A protected from the excessive heat of combustion.

Thus it can be seen that a novel internal combustion engine has been provided having means provided thereon for more efficient cooling thereof. The more efficient cooling of the engine is achieved by separation of the cylinder head and sealing surfaces by means of an air space between the dome-shaped piston head and dome-shaped cylinder head and through the use of a heat insulative gasket. The improved cooling characteristics are also achieved by spreading the cooling air out into a thin, wide sheet to more efficiently cool the surfaces which have been exposed to the heat of combustion. While the invention has been described as being ideally suited for use with internal cooling air, it should be noted that the engine could be cooled with external means if desired.

Thus it can be seen that the internal combustion engine of this invention accomplishes at least all of its stated objectives.

I claim:

1. An internal combustion engine, comprising,
   an engine block means,
   a cylinder sleeve mounted in said block,
   a cylinder head on one end of said sleeve and forming a combustion chamber at said one end of said sleeve,
   means for supplying a combustible fuel to said combustion chamber,
   a piston slidably mounted in said sleeve and movable between a compression position adjacent said cylinder head and an expansion position away from said one end of said sleeve; said piston having a top portion, an elongated central side portion and a lower portion; sealing means on the lower portion of said piston which engages the interior wall surface of said sleeve, said elongated central side portion extending proportionately a substantial distance beyond said lower portion in a direction towards said cylinder head; said elongated central side portion extending far enough above the lower portion to shield from the direct heat of combustion the interior wall surface of said sleeve which is engaged by said sealing means during the initial portion of the expansion stroke of said piston towards said expansion position; said elongated central side portion substantially spacing and separating said sealing means from the heat of combustion;
   the cross-sectional area of said elongated central side portion of said piston being less than said sleeve to provide a thin space between said elongated central side portion of said piston and the inner side walls of said sleeve in both compression and expansion positions;
   an air inlet opening means and an exhaust opening means in said cylinder sleeve; said air inlet opening means in communication with said thin space between said piston and said sleeve, said air inlet opening means being in operative communication with a source of air under pressure, said air inlet opening means being in direct communication with said thin space when said piston is in its expansion position whereby a thin sheet of air will be supplied to said thin space and to the interior of said sleeve and said chamber to purge the exhaust gases therefrom outwardly through said exhaust opening means and to cool the interior wall surface of said sleeve engaged by said sealing means and to surround and cool the elongated central side portion of said piston to effect the cooling of said sealing means,
   a drive shaft rotatably mounted in said block means and extending therefrom,
   and means operatively connecting said piston to said drive shaft whereby combustion of fuel in said chamber causes said drive shaft to be rotated.

2. The engine of claim 1 wherein said thin space has a relatively narrow width when said piston is in its compression position so as to enhance the compression of said combustible fuel; and wherein said space has a relatively wider width when said piston is in its expansion position to permit the introduction of air into said sleeve and into engagement with the elongated central side portion of said piston, and to permit the exiting of gas from said sleeve.

3. The engine of claim 3 wherein said piston has a side wall portion for deflecting the incoming air upwardly into the interior of said sleeve in a thin stream.

4. The engine of claim 1 wherein said piston has a tapered side wall portion for deflecting the incoming air upwardly into the interior of said sleeve in a thin stream.

5. The engine of claim 3 wherein said exhaust opening means and said inlet opening means are located on opposite sides of said sleeve.

6. The engine of claim 3 wherein an air deflector fin means is provided on said piston for preventing the incoming air from passing around the piston to said exhaust opening means.

7. The engine of claim 1 wherein said piston is dome-shaped.

8. The engine of claim 7 wherein said dome-shaped piston has a cut-out portion at one side thereof adjacent said exhaust openings to facilitate the flow of exhaust gases thereby.

9. The engine of claim 1 wherein a heat conductive band extends around said sleeve adjacent said inlet and exhaust opening means to equalize the temperature around said sleeve.

10. The engine of claim 1 wherein a heat conductive means extends through said piston adjacent said sealing means to equalize the temperature around said piston.

11. The engine of claim 1 wherein said elongated central side portion of said piston includes a low heat conducting material to retard the flow of heat from the top portion of said piston to said sealing means.

12. The engine of claim 1 wherein said elongated central side portion of said piston and said sleeve includes a low heat conducting material to retard the flow of heat from the top portion of said piston to said sealing means and to retard the flow of heat from said cylinder head to the interior wall surface of said sleeve that is engaged by said sealing means.

13. The engine of claim 1 wherein said sleeve includes a low heat conducting material to retard the flow of heat from said cylinder head to the interior wall surface of said sleeve that is engaged by said sealing means.

14. The engine of claim 11 wherein said piston is comprised of stainless steel.

15. The engine of claim 12 wherein said piston and said sleeve are comprised of stainless steel.

16. The engine of claim 13 wherein said sleeve is comprised of stainless steel.

17. The engine of claim 1 wherein heat insulation means is provided between said sleeve and the head mounted thereon.

18. The engine of claim 7 wherein the interior shape of said cylinder head is dome-shaped and is substantially complementary to the shape of said piston.

19. The engine of claim 1 wherein said elongated central side portion of said piston includes a low heat conducting material to retard the flow of heat from the top portion of said piston to said sealing means.

20. The engine of claim 1 wherein said engine is a compression type engine.

* * * * *